US 6,550,981 B1

(12) United States Patent
Yamauchi (10) Patent No.: US 6,550,981 B1
(45) Date of Patent: Apr. 22, 2003

(54) OPTICAL MODULE HAVING AN OPTICAL COUPLING BETWEEN AN OPTICAL FIBER AND A LASER DIODE

(75) Inventor: Kenji Yamauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/655,413

(22) Filed: Sep. 5, 2000

(30) Foreign Application Priority Data

Sep. 8, 1999 (JP) .......................................... 11-253886

(51) Int. Cl.[7] ................................................ G02B 6/36
(52) U.S. Cl. .......................................... 385/88; 385/92
(58) Field of Search ..................... 385/88–91, 92–94, 385/55, 60, 70, 75, 80, 81, 52

(56) References Cited

U.S. PATENT DOCUMENTS

| 4,629,284 | A |   | 12/1986 | Malavielle | 350/96.21 |
|---|---|---|---|---|---|
| 5,617,495 | A |   | 4/1997 | Funabashi et al. | 385/92 |
| 5,647,042 | A | * | 7/1997 | Ochiai et al. | 385/56 |
| 5,764,836 | A |   | 6/1998 | Roff | 385/88 |
| 5,909,523 | A | * | 6/1999 | Sakaino et al. | 385/49 |
| 6,244,755 | B1 | * | 6/2001 | Joyce et al. | 385/90 |
| 6,273,619 | B1 | * | 8/2001 | Shahid et al. | 385/70 |
| 6,293,711 | B1 | * | 9/2001 | Sasaki | 385/88 |

FOREIGN PATENT DOCUMENTS

| EP | 0 943 943 |   | 9/1999 |   |
|---|---|---|---|---|
| JP | 60-229004 | * | 11/1985 | 385/88 |
| JP | 7-77633 A |   | 3/1995 |   |
| JP | 8-166523 A |   | 6/1996 |   |
| JP | 9-105839 |   | 4/1997 |   |
| JP | 9-105839 A |   | 4/1997 |   |
| JP | 2654538 B2 |   | 5/1997 |   |
| JP | 10-232330 A |   | 9/1998 |   |
| JP | 10-300987 A |   | 11/1998 |   |
| JP | 10-300987 |   | 11/1998 |   |
| JP | 11-14860 A |   | 1/1999 |   |
| JP | 11-237532 A |   | 8/1999 |   |
| JP | 2001074982 | * | 3/2001 | 385/88 |
| WO | WO 98/34148 |   | 9/1998 |   |

OTHER PUBLICATIONS

1. Yamano et al., "Scalable QoS guaranteed VPN scheme based on MPOA", *Technical Report of IEICE*, vol. 98, No. 670, Mar. 19, 1999, pp. 75–80.

* cited by examiner

*Primary Examiner*—Huy Mai
(74) *Attorney, Agent, or Firm*—Sughrue Mion, PLLC

(57) ABSTRACT

A laser diode is disposed on a silicon substrate. An optical fiber is inserted into a ferrule with a substantially constant cross-section. The ferrule is disposed at a V-shape groove formed on the substrate to optically couple the optical fiber with the laser diode.

36 Claims, 7 Drawing Sheets

OPTICAL MODULE HAVING AN OPTICAL COUPLING BETWEEN AN OPTICAL FIBER AND A LASER DIODE

BACKGROUND OF THE INVENTION

1. Field of the Invention

The present invention relates to an optical module. In particular, it relates an optical module having an optical coupling between an optical fiber and a laser diode.

2. Description of the Related Art

In a conventional optical module using a passive alignment mounting technique, it is important to ensure accuracy of the relative positions of a laser diode (LD) chip and an optical fiber at a sub-micron level.

Figure 1:
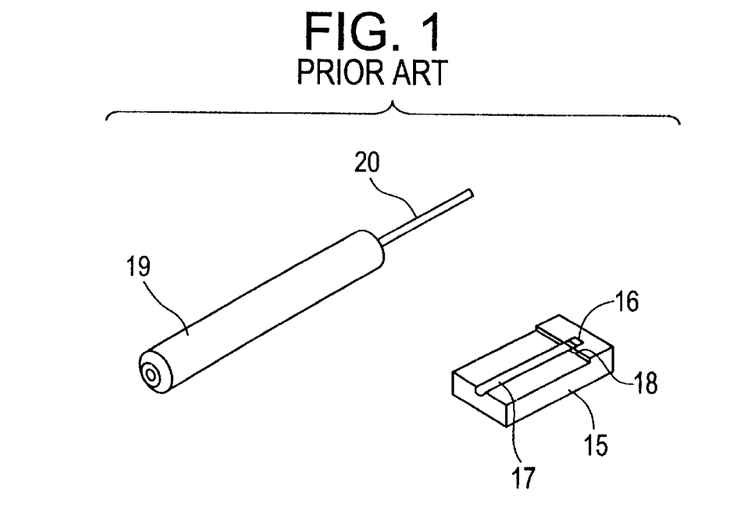
FIG. 1 is a perspective view showing a conventional optical module.

Conventionally, therefore, a V-shape groove 17 (it may be simply called a V groove in this optical technology fields) is formed on a silicon (Si) substrate using anisotropic etching, and a mount mark (not shown) for mounting an LD chip 16 and a slit part 18 are also formed on the Si substrate 15 as shown in FIG. 1. In FIG. 1, an optical fiber 20 is inserted into a ferrule 19.

Figure 2:
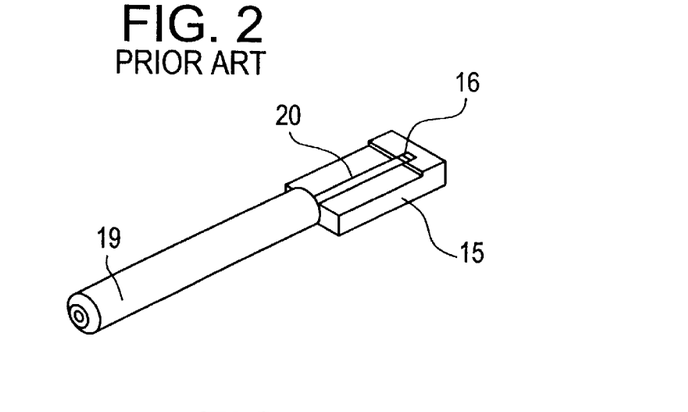
FIG. 2 is another perspective view showing the conventional optical module shown in FIG. 1.
Figure 3:
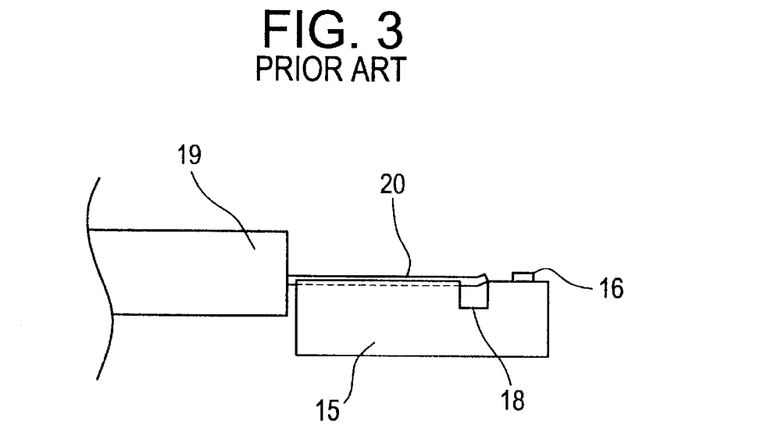
FIG. 3 is a side view showing the conventional optical module shown in FIG. 1.

Referring to FIGS. 2 and 3, the LD chip 16 is mounted in alignment with the mount mark, and a portion of the optical fiber 20 is so mounted onto the V-shape groove 17 as to provide optical coupling with the LD chip 16.

However, in the conventional optical module, while the mounting accuracy of the LD chip 16 on the Si substrate 15 is satisfactory, there is a problem in the mounting of the optical fiber 20 onto the V-shape groove 17 due to a high degree of flexibility of the optical fiber 20.

More specifically, as shown in FIG. 3, since the end of the optical fiber 20 is likely to warp at the slit part 18, it is rather difficult to mount the optical fiber 20 onto the V-shape groove 17 in a consistent state.

Moreover, in common practice of securing the optical fiber 20 to the V-shape groove 17, the optical fiber 20 is temporarily set to the V-shape groove 17 first, and then a downward pressure is applied to the optical fiber 20 on the bevel of the V-shape groove 17 for positioning the optical fiber 20.

At this process, if the V-shape groove 17 has any slight distortion, it is not allowed to accurately secure the optical fiber 20 at a predetermined position, i.e., accuracy of relative positions of the LD chip 16 and the optical fiber 20 cannot be attained at a sub-micron level, making it impossible to provide desired efficiency of optical coupling.

Even if the V-shape groove 17 is accurately formed, an end position of the optical fiber 20 may slightly vary depending on a pressing position to be taken or a degree of force to be exerted on the optical fiber 20 which has been temporarily set on the V-shape groove 17, making it difficult to consistently secure the end of the optical fiber 20 at a predetermined accurate position.

Further, in positioning the optical fiber 20 for optical coupling between the LD chip 16 and the optical fiber 20, the end position of the optical fiber 20 in relative relationship with the LD chip 16 is of critical importance. In the conventional technique of directly mounting the optical fiber 20 on the V-shape groove 17, it is difficult to accurately determine the end position of the optical fiber 20, giving rise to a significant problem in terms of workability and yield of optical coupling.

Figure 4:
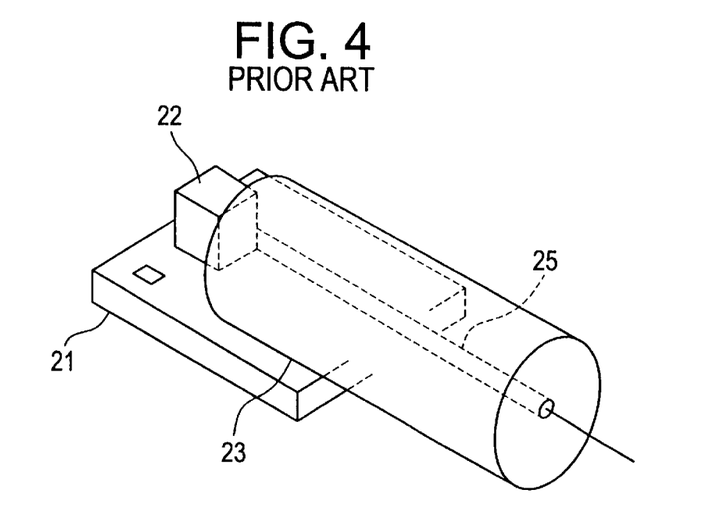
FIG. 4 is a perspective view showing another conventional optical module.
Figure 5:
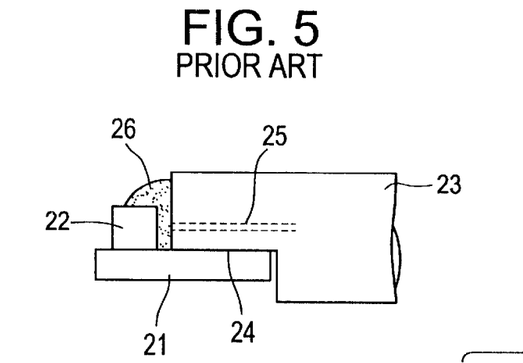
FIG. 5 is a side view showing the conventional optical module shown in FIG. 4.

In Japanese Unexamined Patent Publication No. Hei-10-300987, there is disclosed a structure in which a ferrule 23 fixedly attached around an optical fiber 25 is used for optical coupling between an LD chip 22 mounted on an Si substrate 21 and the optical fiber 25 as shown in FIGS. 4 and 5.

In this conventional optical module, the ferrule 23, which is made of zirconia, is fixedly attached around the optical fiber 25, and then the ferrule 23 is directly mounted on the Si substrate 21 for providing optical coupling with the LD chip 22. There is no groove formed on the Si substrate 21, on the other hand, a notch part 24 is formed at the end of the ferrule 23. A space between the LD chip 22 and the ferrule 23 is filled with a refractive index matching material 26.

According to the conventional optical module, since the zirconia ferrule 23 which is sufficiently lower in flexibility than the optical fiber 25 is mounted on the Si substrate 21, it is possible to enhance workability and stability with respect to a mounting position on the Si substrate 21.

In the conventional optical module, however, since the notch part 24 is formed at the end of the zirconia ferrule 23, there arises a problem of a substantial increase in fabrication cost of the ferrule 23.

More specifically, it is rather difficult to form the notch part 24 because of poor working property of zirconia. For use in practice, the side face of the ferrule 23 must be finished with high precision. Since it is required to perform a process step of forming the notch part 24 before a process step of polishing the side face of the ferrule 23, complexity occurs in fabrication of the ferrule 23. In addition, it becomes difficult to handle the ferrule 23 having the notch part 24 formed thereon.

Further, when mounting the ferrule 23 on the Si substrate 21, it is required to let the notch part 24 of the ferrule 23 meet a flat surface area of the Si substrate 21. Therefore, the ferrule 23 must be adjusted properly in a rotational direction at the time of mounting, whereby the mounting process becomes more complex.

Moreover, though accuracy is required in formation of the notch part 24 at a sub-micron level, it is extremely difficult to ensure such high accuracy in fabrication of the ferrule 23 made of zirconia having poor working property. Still further, in this conventional optical module, a crosswise position reference is not available since no V-shape groove is formed on the Si substrate 21. Therefore, it is impossible to attain crosswise positioning accuracy as high as that in the use of a V-shape groove.

Contrary to intended improvement in workability of mounting on the Si substrate 21, the above problem would cause a decrease in mounting accuracy and an increase in fabrication cost.

Further, another conventional optical module is disclosed in Japanese Unexamined Patent Publication No. Hei 9-105839, wherein it has been proposed to provide a structure in which an optical fiber fixed in a stepped ferrule is set to a V-shape groove formed on an Si substrate and then an LD chip is securely positioned with high accuracy at the end of the stepped ferrule. According to this conventional optical module, it is possible to carry out the assembling and fixing of an optical fiber easily in a simple manner.

However, in this conventional optical module, since the ferrule has a stepped form, a thick-diameter part of the ferrule, which is coupled with an external optical connector, and a thin-diameter part of the ferrule, which is mounted on the V-shape groove, must be formed so that both of them are aligned with respect to center axes of the optical fiber and the ferrule.

Therefore, complexity occurs in fabrication of the ferrule, which would cause a substantial increase in fabrication cost and a decrease in yield.

The stepped structure of the ferrule in this conventional optical module is intended to prevent a stress from being applied to a retention part on the V-shape groove when a spring force is exerted from an external connector. In other words, since a stress is likely to concentrate at a stepped part of the ferrule, there is a possibility that the stepped ferrule may be damaged by a spring force exerted from the external connector.

SUMMARY OF THE INVENTION

It is therefore an object of the present invention to provide an optical module and a method of making thereof capable of enhancing mounting accuracy of a ferrule.

Another object of the present invention is to provide an optical module and a method of making thereof capable of enhancing yield in making an optical module.

Still another object of the present invention is to provide an optical module and a method of making thereof capable of reducing fabrication cost.

In order to achieve the above objects, an optical module according to an embodiment of the present invention comprises a substrate on which a groove is formed, a laser diode disposed on the substrate, an optical fiber, and a ferrule with a substantially constant cross section, wherein the optical fiber is inserted into the ferrule and the ferrule is disposed in the groove of the substrate to optically couple the optical fiber with the laser diode.

The groove may be V-shaped and the ferrule a cylindrical shape, the outside diameter of which is substantially constant.

In order to achieve the above objects, a method of making an optical module according to an embodiment of the present invention comprises forming a groove on a substrate, mounting a laser diode on the substrate, mounting a ferrule in the groove of the substrate to optically couple the optical fiber with the laser diode, wherein the ferrule has a cylindrical pipe shape the outside diameter of which is substantially a constant, and an optical fiber is inserted into the ferrule.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Preferred embodiments according to the present invention will now be discussed in detail with reference to the accompanying drawings. It is to be understood that the invention disclosed herein is not limited to only the preferred embodiments herein after described.

1. First Embodiment

Figure 6:
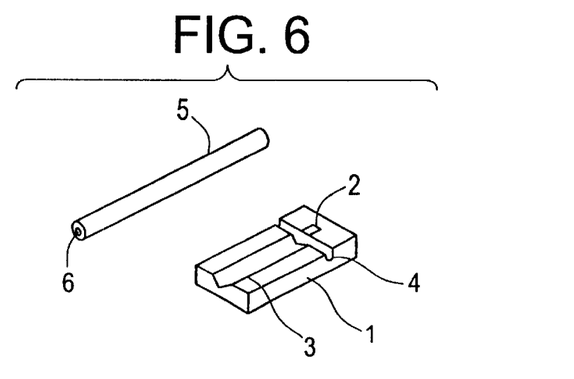
FIG. 6 is a perspective view showing a first embodiment of a main portion of an optical module according to the present invention.
Figure 7:
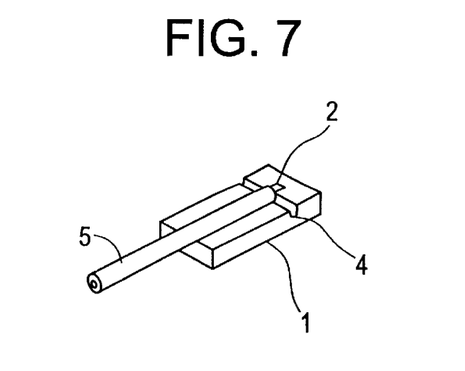
FIG. 7 is a perspective view the main portion of the optical module in which a ferrule indicated in FIG. 6 is mounted on an Si substrate.
Figure 8:
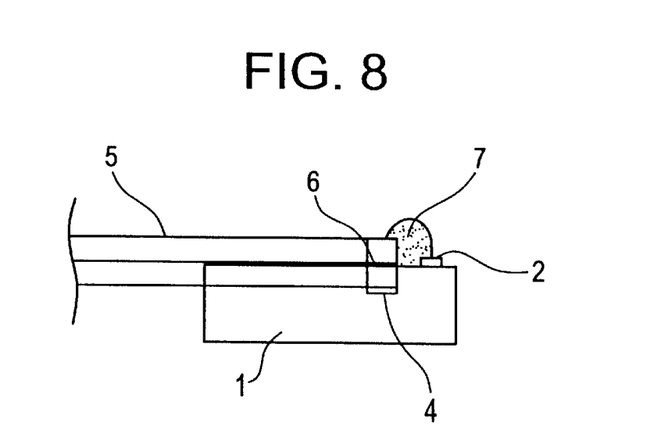
FIG. 8 is a sectional view showing the main portion of the optical module shown in FIG. 7.

As shown in FIGS. 6 to 8, an optical module according to a first embodiment of the present invention comprises a silicon (Si) substrate 1, on which a groove 3 is formed, preferably by anisotropic etching. The groove 3 may be V-shaped, and in the preferred embodiments herein described are shown as V-shaped. However, the groove is not limited to a V-shape and any other suitable shape for the groove may be used. For example, and not by way of limitation, the groove may be a hemispherical groove, a hemispherical groove with a bottom slot, an elliptical groove, an elliptical groove with a bottom slot, a rectangular shaped grooved, a rectangular shaped groove with a bottom slot, or a tapered (or trapezoidal) groove as shown in FIGS. 14a–14g. Again, these shapes are by way of example only, the invention not being limited to any specific groove shape.

A slit part 4 and a positioning mark (not shown) are also formed on the Si substrate 1, wherein the mark is used as a positioning reference for mounting a laser diode (LD) chip 2 on the Si substrate 1. The LD chip 2 is precisely mounted on the Si substrate 1 using the mark.

Figure 15A:
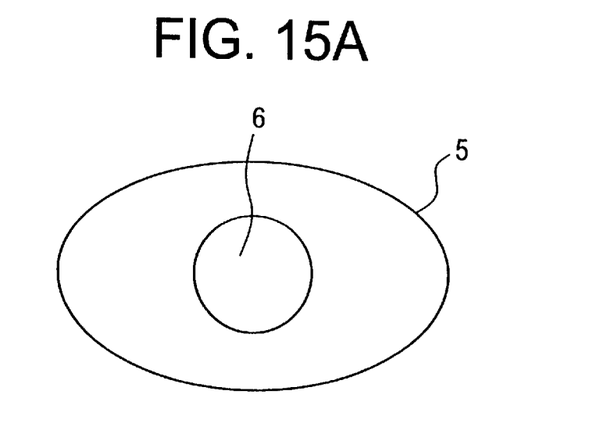
FIGS. 15a and 15b are examples of ferrule cross-sections that may be used with the invention.
Figure 15B:
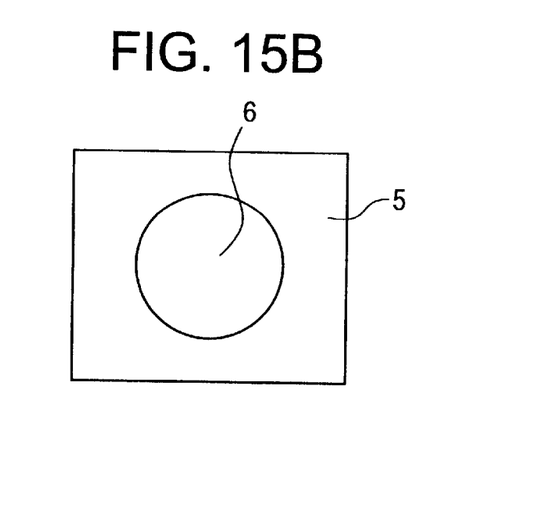

A ferrule or other sheathing 5 to be mounted onto the V-shape groove 3 of the Si substrate 1 is fixedly attached around an optical fiber 6. The ferrule 5 is preferably cylindrical shaped with a substantially constant outside-diameter, wherein one end portion at the opposite side to the LD chip 2 is slightly tapered to make a frustum shape (not shown). The ferrule may have a shape other than cylindrical. It may, for example and not by way of limitation, be elliptical or of rectangular shape at its cross-section as shown in FIGS. 15a–15b. Whatever shapes are selected for the ferrule and groove, they are to be shaped such that when the ferrule is set in the groove, there is proper optical alignment between the optical fiber 6 within the ferrule and the LD chip 2.

In the preferred embodiment, the width and depth of the V-shape groove 3 are set to meet the outside diameter of the ferrule 6, and the V-shape groove 3 is also formed at an optimum position for providing proper optical coupling between the optical fiber 6 and the LD chip 2.

The ferrule 5 is so formed that the outside diameter thereof is in a range of approximately 0.4 mm to 1.25 mm.

Note that if the outside diameter of the ferrule 5 is too thick, it may become necessary to increase the thickness of the Si substrate 1. Also, there may arise difficulty in formation of the V-shape groove 3 with appropriate width and depth.

On the contrary, if the outside diameter of the ferrule 5 is too thin, difficulty may occur in fabrication of the ferrule 5. The outside diameter of the ferrule 5 is preferably in a range of 0.5 mm to 0.7 mm. Thus, it is not required to increase the thickness of the Si substrate 1, and the ferrule 5 can be fabricated with productivity which is at least equal to that in conventional practice, making it possible to embody the present invention at low cost.

The ferrule 5 may be formed of zirconia, metal, borosilicate glass, or crystallized glass or other suitable materials. In consideration of strength of the ferrule 5 having a limited size of outside diameter, it is preferable to use zirconia as a material thereof.

The ferrule 5 is mounted onto the V-shape groove 3 which has been formed on the Si substrate 1 to meet the outside diameter of the ferrule 5. Thus, optical coupling is provided between the LD chip 2 and the optical fiber 6. At this step, as shown in FIG. 3, a refractive index matching material 7 is applied to a point between the LD chip 2 and the optical fiber 6 for the purpose of preventing unstable oscillation of the LD chip 2, which would otherwise occur due to reflection of light from the end face of the optical fiber 6 to the LD chip 2.

Next, an assembling procedure for the optical module structured as mentioned above will be discussed.

First, the optical fiber 6 is inserted into the ferrule 5 which has a through-hole at the center thereof, and the optical fiber 6 is adhesively secured to the ferrule 5. Then, both ends of the ferrule 5 are polished. On the other hand, the LD chip 2 is mounted onto the Si substrate 1 with reference to the positioning mark (not shown) formed on the Si substrate 1 for mounting the LD chip 2.

Then, the ferrule 5 having both ends thereof polished is mounted onto the V-shape groove 3 of the Si substrate 1. At this step of mounting, the ferrule 5 is secured with an adhesive, solder or the like while pressing the ferrule 5 against the V-shape groove 3.

The refractive index matching material 7 having an index of refraction in a range between those of air and the optical fiber 6 is filled to a space between the LD chip 2 and the ferrule 5. Relative positions of the LD chip 2 and the optical fiber 6 fixed to the ferrule 5 are predetermined in consideration of a positional relationship in an optical arrangement using the refractive index matching material 7.

The most important advantageous effect of the present invention is provided when the ferrule 5 is mounted onto the V-shape groove 3. In the conventional mounting of an optical fiber onto a V-shape groove, the end position of the optical fiber may slightly vary depending on a pressing position to be taken or a degree of force to be exerted on the optical fiber which has been temporarily set on the V-shape groove. If the end position of the optical fiber slightly varies, there occur variations in relative positions of the optical fiber and an LD chip.

By way of contrast, in the first embodiment of the present invention, since the ferrule 5 made of a material such as zirconia having a sufficiently high degree of hardness is mounted onto the V-shape groove 3, the end position of the optical fiber 6 does not vary depending on a pressing position to be taken or a degree of force to be exerted on the optical fiber 6 at the time of mounting.

Thus, the end of the optical fiber 6 is always disposed at a predetermined position, making it possible to ensure consistent optical coupling between the LD chip 2 and the optical fiber 6. Further, since the optical fiber 6 which is rather vulnerable is not directly handled when the optical fiber 6 is mounted onto the V-shape groove 3, the handling of parts in assembling is facilitated, which would contribute to a significant improvement in workability.

Moreover, since the ferrule 5 has a cylindrical-pipe shape without any notch part or step part, fabrication cost of the ferrule 5 can be reduced.

Figure 9:
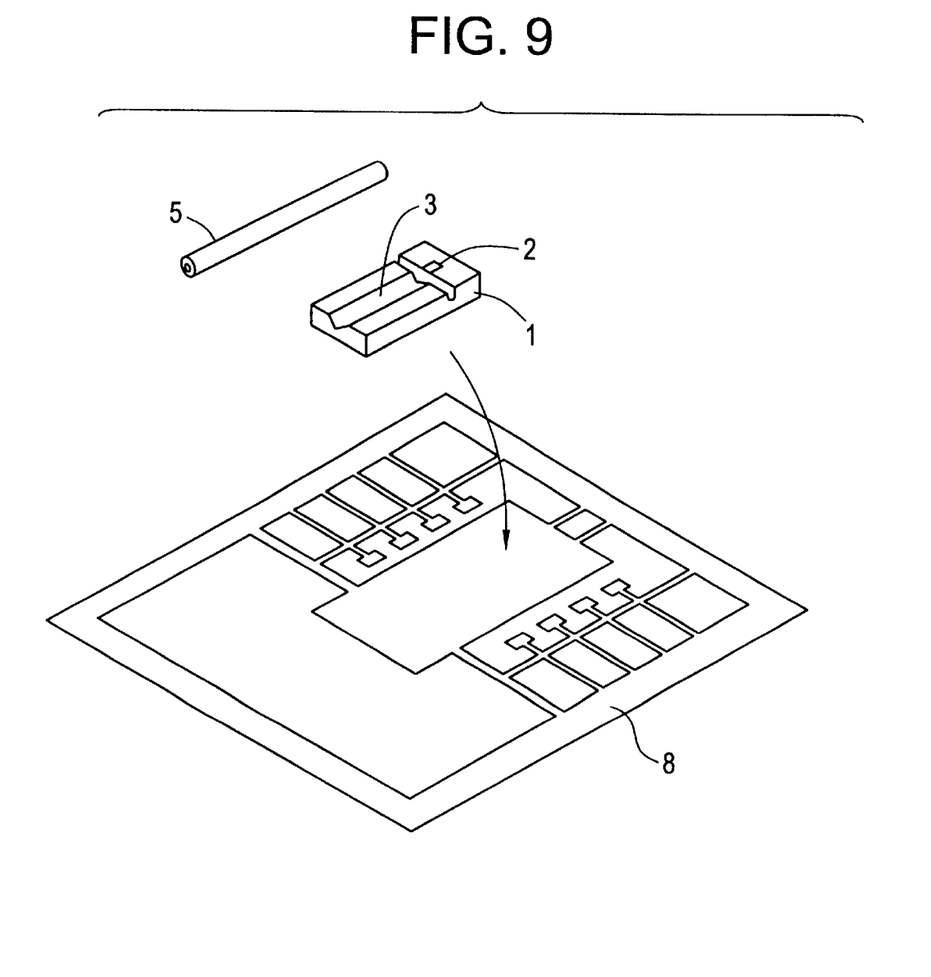
FIG. 9 is an explanatory diagram showing an assembling procedure for the optical module shown in FIGS. 6 to 8.
Figure 10:
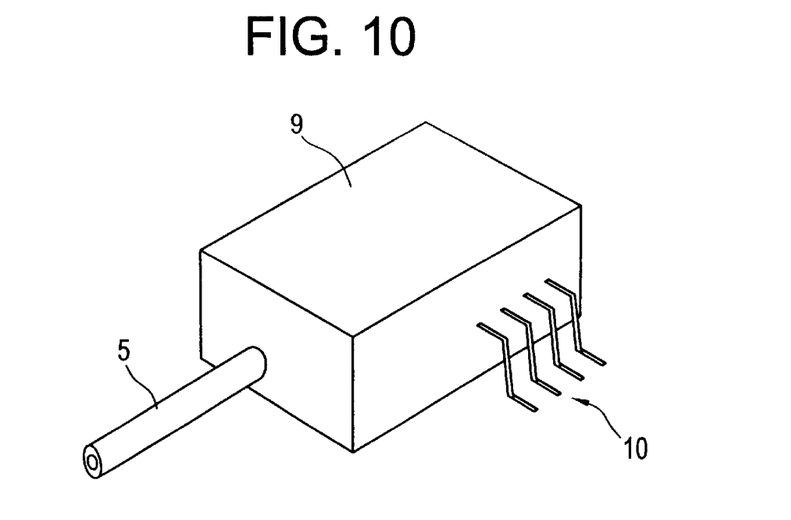
FIG. 10 is another explanatory diagram showing the assembling procedure for the optical module shown in FIGS. 6 to 8.

In the first embodiment of the present invention, the Si substrate 1 is mounted on a lead frame 8 as shown in FIG. 9, and then the Si substrate 1 is enclosed in a package 9 having lead terminals 10 as shown in FIG. 10.

At this step, a part of the ferrule 5 is extended outside the package 9. In this state, by aligning the extended ferrule 5 with another ferrule for coupling, it is possible to provide a very small receptacle type of optical module.

As described above, in the first preferred embodiment of the present invention, the ferrule 5 attached around the optical fiber is directly mounted onto the V-shape groove 3 which has been formed on the Si substrate 1 having the LD chip 2. Thus, proper optical coupling is provided between the LD chip 2 and the optical fiber.

It is therefore not required to form a notch part on the ferrule as in the conventional arrangement, making it possible to obviate a decrease in mounting accuracy which would otherwise occur due to the notch part. Further, since it is not required to form a notch part or a stepped structure on the ferrule as in the conventional arrangement, a substantial increase in fabrication cost of the ferrule and a decrease in yield can be circumvented. Still further, since the optical fiber which is rather vulnerable is not directly handled at the time of mounting onto the V-shape groove 3, the handling of parts in assembling is facilitated to contribute to a significant improvement in workability.

2. Second Embodiment

While the ferrule 5 having both ends thereof polished is used in the first embodiment, one end of a ferrule is polished and the other unpolished end thereof is coupled with an optical fiber cord in a second embodiment.

Figure 11A:
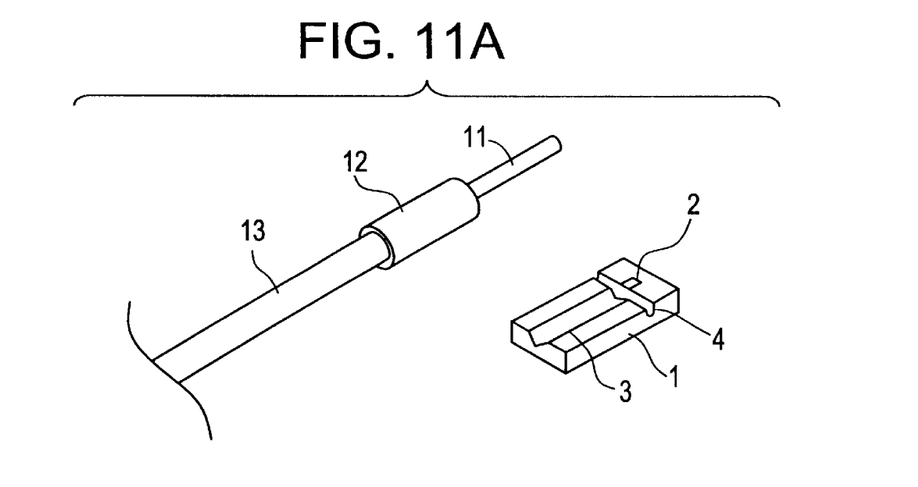
FIG. 11A is a perspective view showing a second embodiment of a main portion of an optical module according to the present invention.
Figure 11B:
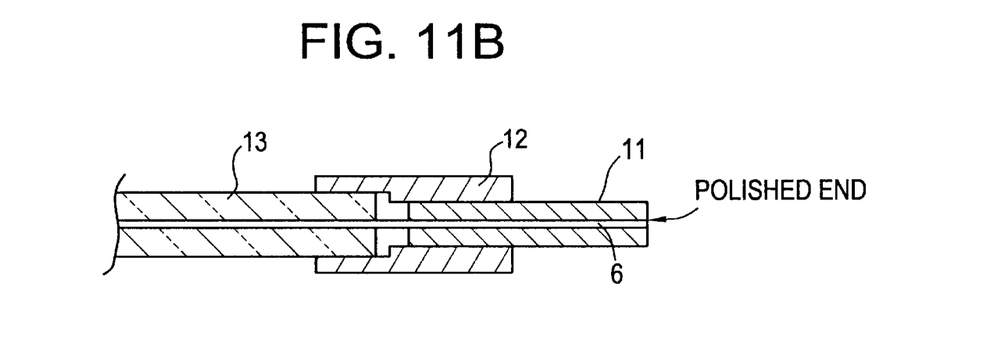
FIG. 11B is a sectional view showing the main portion shown in FIG. 11A.

As shown in FIGS. 11A and 11B, a ferrule 11 is fixedly attached around an optical fiber 6. The unpolished end of the ferrule 11 is coupled with an optical fiber cord 13. A metallic sleeve 12 is securely press-fitted to the ferrule 11 and is also adhered to the optical fiber cord 13.

At the center of the ferrule 11, there is provided a through-hole for inserting the optical fiber 6. The ferrule 11 has a cylindrical-pipe shape the outside diameter of which is substantially a constant. Since the outside diameter of the optical fiber cord 13 is larger than that of the optical fiber inserted into the ferrule 11, a part of the vulnerable optical fiber is exposed from the end of the ferrule 11 unless the sleeve 12 is attached. Therefore, the sleeve 12 is attached to a joint between the ferrule 11 and the optical fiber cord 13 so that the optical fiber is not exposed partially.

As in the first embodiment described in the foregoing, the ferrule 11 is mounted onto the V-shape groove 3 which has been formed on the Si substrate 1. Thus, optical coupling between the ferrule 11 and the LD chip 2 is provided.

Figure 12:
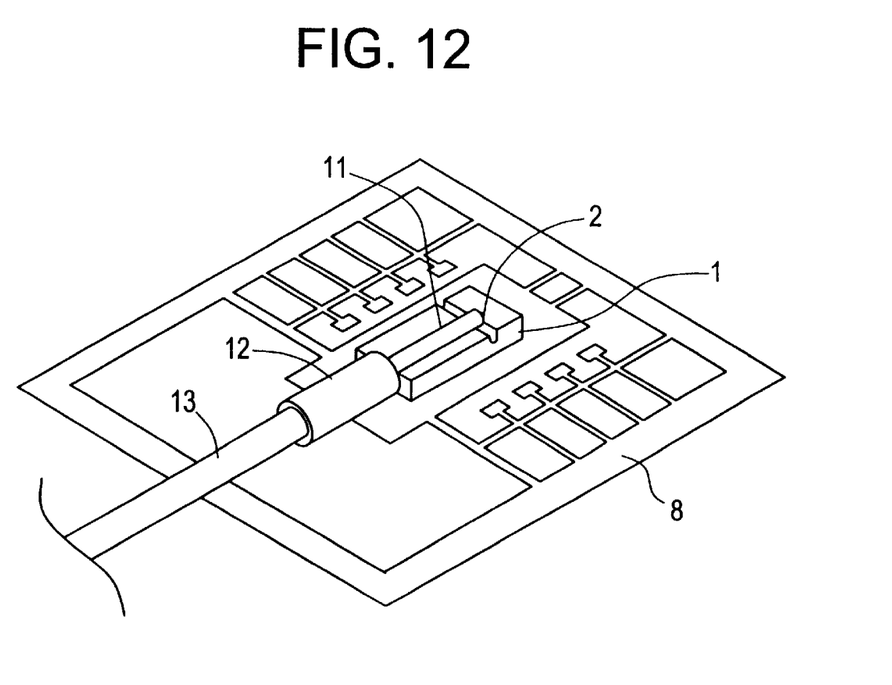
FIG. 12 is an explanatory diagram showing an assembling procedure for the optical module shown in FIG. 11.
Figure 13:
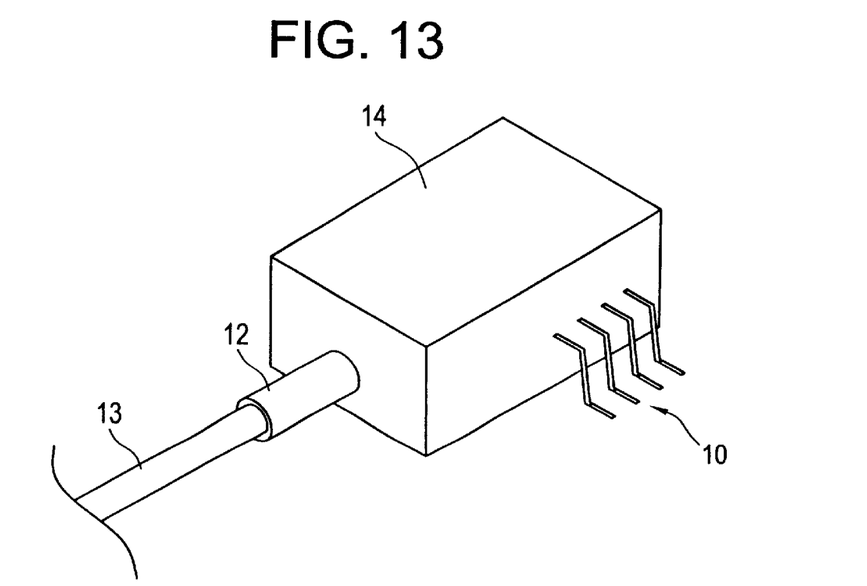
FIG. 13 is another explanatory diagram showing the assembling procedure for the optical module shown in FIG. 11.
Figure 14A:
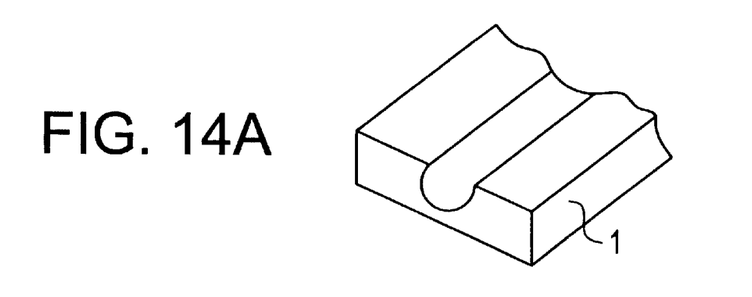
FIGS. 14a–14g illustrate examples of groove configurations that may be used with the invention.
Figure 14B:
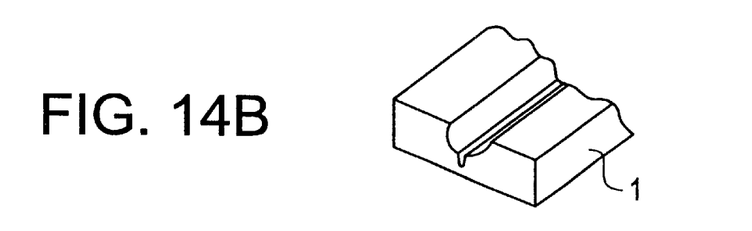
Figure 14C:
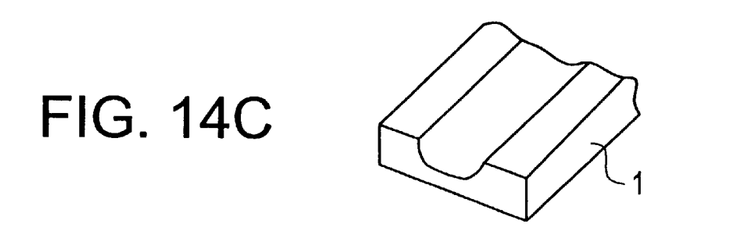
Figure 14D:
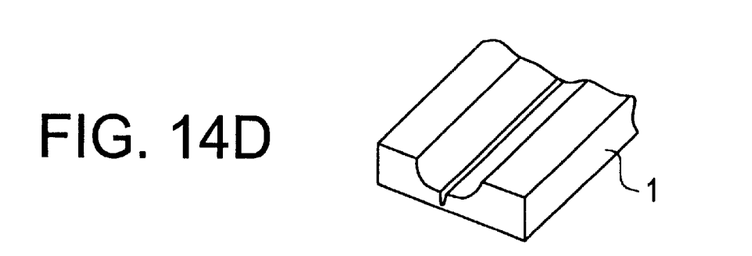
Figure 14E:
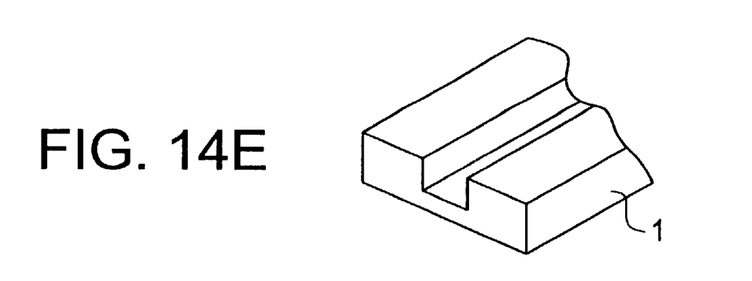
Figure 14F:
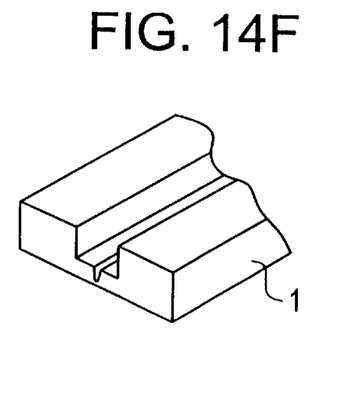
Figure 14G:
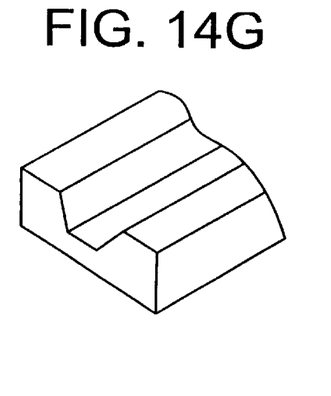

Then, after the Si substrate 1 is mounted on the lead frame 8 as shown in FIG. 12, the Si substrate 1 is enclosed in a package 14 having lead terminals 10 as shown in FIG. 13. Thus, a pigtail type of optical module is provided by securing the ferrule 11 to the end of the optical fiber cord 13.

As described above, in the second embodiment, the unpolished end of the ferrule 11 is coupled with the optical fiber cord 13, and the metallic sleeve 12 is attached to the joint between the ferrule 11 and the optical fiber cord 13. It is therefore possible to provide the pigtail-type optical module without decreasing workability.

That is to say, since the ferrule 11 having high dimensional accuracy which is fixedly attached around the optical fiber is handled, a significant improvement in workability can be attained.

By way of contrast, in the conventional mounting of an optical fiber onto a V-shape groove for a pigtail-type optical module, the vulnerable optical fiber is directly mounted onto the V-shape groove, causing poor workability. In some cases, there may occur a problem that the optical fiber is broken during mounting practice.

While there has been described the second embodiment in which the ferrule 11 is mounted onto the V-shape groove 3, it is to be understood that the present invention is not limited thereto. In a modified arrangement, a part of the sleeve 12 may be mounted onto the V-shape groove 3.

In the above case, a V-shape groove or any other groove for mounting a part of the sleeve 12 is formed on the Si substrate 1. By mounting a part of the sleeve 12 on the Si substrate 1 in this manner, it becomes possible to increase strength of fixation between the sleeve 12 and the Si substrate 1.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical module, comprising:
   a substrate on which a groove is formed;
   a laser diode disposed on said substrate;
   an optical fiber; and
   a ferrule with a substantially constant cross-section, wherein said optical fiber is disposed in said ferrule and said ferrule is disposed in the groove of said substrate to optically couple said optical fiber with said laser diode.

2. The optical module as claimed in claim 1, wherein the groove formed on said substrate has a V-shape.

3. The optical module as claimed in claim 1, wherein the ferrule has a cylindrical shape, the outside diameter of which is substantially constant.

4. The optical module as claimed in claim 1, wherein said ferrule is formed of material selected from the group consisting of zirconia, metal, borosilicate glass and crystallized glass.

5. The optical module as claimed in claim 4, wherein said ferrule is formed of zirconia.

6. The optical module as claimed in claim 1, wherein said ferrule has the outside diameter within a range of about 0.4 mm to about 1.25 mm.

7. The optical module as claimed in claim 6, wherein said ferrule has the outside diameter within a range of about 0.5 mm to about 0.7 mm.

8. The optical module as claimed in claim 1, further comprising a refractive index matching material disposed between said laser diode and said optical fiber to prevent unstable oscillation of said laser diode.

9. The optical module as claimed in claim 1, wherein said ferrule has at least one polished end surface.

10. The optical module as claimed in claim 1, further comprising a package packaging said substrate, said laser diode, said optical fiber and said ferrule.

11. The optical module as claimed in claim 10, wherein a portion of said ferrule is exposed from said package.

12. The optical module as claimed in claim 1, further comprising:
    a optical fiber cord coupled to said ferrule; and
    a sleeve attached to a joint between said ferrule and said optical fiber cord.

13. The optical module as claimed in claim 12, wherein said sleeve is formed of metal.

14. The optical module as claimed in claim 12, wherein a portion of said sleeve is disposed at the groove of said substrate.

15. The optical module as claimed in claim 12, further comprising a package packaging said substrate, said laser diode, said optical fiber, said ferrule and a portion of said sleeve.

16. The optical module as claimed in claim 15, said optical fiber cord and a portion of said sleeve are exposed from said package.

17. The optical module as claimed in claim 12, wherein an end of said ferrule to which said optical fiber cord is not coupled is polished.

18. The optical module as claimed in claim 1, wherein the groove formed on said substrate has a hemispherical shape.

19. The optical module as claimed in claim 1, wherein the groove formed on said substrate has a hemispherical shape with a slot at its bottom.

20. The optical module as claimed in claim 1, wherein the groove formed on said substrate has an elliptical shape.

21. The optical module as claimed in claim 1, wherein the groove formed on said substrate has an elliptical shape with a slot at its bottom.

22. The optical module as claimed in claim 1, wherein the groove formed on said substrate has a rectangular shape.

23. The optical module as claimed in claim 1, wherein the groove formed on said substrate has an rectangular shape with a slot at its bottom.

24. The optical module as claimed in claim 1, wherein the groove formed on said substrate has a tapered shape.

25. The optical module as claimed in claim 1, wherein the ferrule has an elliptical shape with a substantially constant cross-section.

26. The optical module as claimed in claim 1, wherein the ferrule has a rectangular shape.

27. The optical module as claimed in claim 1, wherein the ferrule has a rectangular shape with a substantially constant cross-section.

28. A method of making an optical module, comprising:
    forming a groove on a substrate;
    mounting a laser diode on the substrate; and mounting a ferrule with a substantially constant cross-section and with an optical fiber positioned therein, in the groove of the substrate to optically couple the optical fiber with the laser diode.

29. The method of making an optical module as claimed in claim 28, wherein the forming forms the groove by anisotropic etching.

30. The method of making an optical module as claimed in claim 28, further comprising:
    polishing at least one end surface of the ferrule.

31. The method of making an optical module as claimed in claim 28, further comprising:
    forming the ferrule so that the outside diameter of which is within a range of about 0.4 mm to about 1.25 mm.

32. The method of making an optical module as claimed in claim 31, wherein forming the ferrule so that the outside diameter of which is within a range of about 0.5 mm to about 0.7 mm.

33. The method of making an optical module as claimed in claim 28, further comprising:

coupling the ferrule with an optical fiber cord; and attaching a sleeve to a joint between the ferrule and the optical fiber cord.

34. The method of making an optical module as claimed in claim 33, wherein the sleeve is press-fitted to the ferrule.

35. The method of making an optical module as claimed in claim 28, further comprising:

filling with a refractive index matching material a space between the laser diode and the ferrule to prevent unstable oscillation of the laser diode.

36. The method of making an optical module as claimed in claim 28, further comprising:

mounting the substrate on a lead frame; and packaging the substrate mounted on the lead frame.

* * * * *